(12) United States Patent
Lehmann

(10) Patent No.: US 7,187,633 B2
(45) Date of Patent: Mar. 6, 2007

(54) MARKING OF A DATA MEDIUM MATERIAL FOR INFORMATION INTENDED FOR REPRODUCTION

(76) Inventor: Gerhard Lehmann, Grünlingweg 3a, 12359 Berlin (DE)

( * ) Notice: Subject to any disclaimer, the term of this patent is extended or adjusted under 35 U.S.C. 154(b) by 264 days.

(21) Appl. No.: 10/845,230

(22) Filed: May 14, 2004

(65) Prior Publication Data

US 2005/0007921 A1    Jan. 13, 2005

(30) Foreign Application Priority Data

Jul. 11, 2003  (EP)  ................. 03015888
Mar. 2, 2004  (DE)  ................. 20 2004 003 254 U

(51) Int. Cl.
*G11B 5/09*  (2006.01)

(52) U.S. Cl. ................. 369/47.15; 369/47.22; 369/53.21; 369/53.45

(58) Field of Classification Search ...................... None
See application file for complete search history.

(56) References Cited

U.S. PATENT DOCUMENTS

| | | |
|---|---|---|
| 5,398,231 A | 3/1995 | Shin et al. |
| 5,400,319 A | 3/1995 | Fite et al. |
| 5,607,188 A | 3/1997 | Bahns et al. |
| 6,259,575 B1 | 7/2001 | Thomas, III et al. |

FOREIGN PATENT DOCUMENTS

| | | |
|---|---|---|
| DE | 3707608 A1 | 9/1988 |
| EP | 0 574 136 | 12/1993 |
| EP | 0 574 239 | 12/1993 |
| EP | 0 605 141 | 7/1994 |
| EP | 0 741 382 A1 | 11/1996 |
| EP | 0 785 547 A2 | 7/1997 |
| EP | 0 802 527 A1 | 10/1997 |
| WO | WO 85/02293 | 5/1985 |
| WO | WO 92/06409 | 4/1992 |
| WO | WO 94/24665 | 10/1994 |
| WO | WO 99/13470 | 3/1999 |
| WO | WO 99/56175 | 11/1999 |
| WO | WO 01/35163 A1 | 5/2001 |

OTHER PUBLICATIONS

PCT International Search Report issued by EPO on Oct. 4, 2004.

*Primary Examiner*—Muhammad Edun
(74) *Attorney, Agent, or Firm*—Westerman, Hattori, Daniels & Adrian, LLP.

(57) ABSTRACT

A method of identifying a mechanically readable medium is described. The medium, for instance a gramophone record, a magnetic tape or a celluloid film, contains information which is contained in a continuous sequence on the medium and is intended for optical or acoustic reproduction. A sequence of markings which individualizes the medium, and which can be read out together with the acoustic or optical information, is formed in the area of this acoustic or optical information.

25 Claims, 5 Drawing Sheets

MARKING OF A DATA MEDIUM MATERIAL FOR INFORMATION INTENDED FOR REPRODUCTION

FIELD OF THE INVENTION

The invention concerns machine-readable data medium materials. More precisely, the invention concerns the individualization of such data medium materials or copies thereof.

BACKGROUND OF THE INVENTION

Mechanisms for reproducing (playing back) information are in the focus of many technical areas. Usually, the information which is intended for reproduction is contained on a physical medium, which is read out using suitable devices. The read-out information is then reproduced optically, acoustically, optically and acoustically combined, or in another perceivable way.

Various circumstances in connection with the handling of the medium make identifying it (or copies obtained therefrom) seem desirable. Thus in the production of media, there is often the requirement to provide the media with an individualizing identification such as a running serial number or batch designation. Such identification makes it easier subsequently to determine production sites, production parameters, sales routes, media copies (and/or the corresponding master media), etc.

In general, the medium is identified by, for instance, a serial number being applied to a surface of the medium using suitable printing or engraving techniques. To avoid affecting the reproduction of the information, care is taken that the identification is applied separately from those areas of the medium which contain information which is intended for reproduction.

In practice, it has been found that traditional identifications are frequently manipulated, intentionally and unintentionally.

The invention is based on the object of giving an improved approach to the identification of a machine-readable medium which contains information intended for reproduction.

SUMMARY OF INVENTION

According to the invention, this object is achieved by a method of marking a machine-readable medium containing information which is contained in a continuous sequence on the medium and is intended for reproduction, a sequence of markings which individualizes the medium, and which can be read out together with the information intended for reproduction, being formed in the area of the information intended for reproduction.

This approach makes it possible to link the markings which are provided to identify the medium (whether an original or a copy thereof) uniquely to the information intended for reproduction. The consequence of the linkage can be a medium-individualizing change of the information intended for reproduction, so that the reproduction of the information is also changed in a medium-individualizing way.

The information which is contained on the medium can be reproduced (i.e., played back) optically, acoustically, optically and acoustically combined, or in another way. The information intended for reproduction can therefore be sound information or picture (image) information. It is also conceivable that the medium contains both sound and associated picture information.

The medium can contain the information intended for reproduction in various formats. The information intended for reproduction can be, for instance, analog information. It is also possible that the medium provides the information intended for reproduction in a digital format. Digital information can be converted into an analog format before being reproduced.

The markings on the medium can be formed simultaneously with the application of the information intended for reproduction. In this case, the markings can therefore be contained in the information intended for reproduction. However, it is also possible to form the markings on the medium separately in time from the application of the information intended for reproduction. This means that the markings may be formed on the medium already before or only after the application of the information intended for reproduction.

The markings can be formed in very varied ways. The formation of the markings can include a change of magnetic, mechanical or optical properties of the medium. A simultaneous change of several of these properties of the medium is also possible. As an example, the markings may be formed by simultaneously changing the mechanical and optical properties of the medium. As already mentioned, the markings can be formed in such a way that they can be read out together with the information intended for reproduction. In general, it is therefore useful that both the markings and the information intended for reproduction are formed by changing the same property or properties of the medium.

The markings can be formed by mechanical operations on the medium or by a non-contact method. Non-contact formation of markings is possible, for instance, using a laser.

According to another aspect of the present invention, a mechanically-readable medium is provided for information which is contained in a continuous sequence on the medium and which is intended for reproduction. In the area of the information intended for reproduction, a sequence of markings which individualizes the medium is formed, and can be read out together with the information intended for reproduction.

As far as the physical form of the medium is concerned, various possibilities are available. For compatibility reasons, it is useful if the medium according to the invention is in the form of a traditional data medium. If considerations of compatibility can be neglected, other media can also be used. The medium can have a substantially planar shape (e.g. be disc-shaped or tape-shaped).

The information intended for reproduction, with the associated markings, can be read out by means of traditional equipment. Magnetic, mechanical or optical reading methods can be used.

As already explained, the markings are formed in a sequence which individualizes the medium in the area of the information intended for reproduction. This means that the sequence of markings has a function to identify the medium. The markings are preferably not directly readable, individually or as a whole. To fulfil this requirement, the sequence of markings can represent an identification code. The identification code can be a binary code, a grid code or a barcode.

In the case of a binary code, in a sequence of markings, individual markings may be deliberately formed or not formed. The binary code may therefore be determined by the presence or absence of individual markings. A barcode is a sequence of markings of different thickness, i.e. different spatial extent. Other coding types which can be implemented using a sequence of markings can also be used to identify the medium.

The markings can be formed on the medium in such a way that there is little or no interference with the perception of the reproduced information by an audience. Therefore, to capture the markings (which are contained in the information intended for reproduction) for identification, it may be useful to use special capture techniques. Often, such capture techniques run fully automatically.

So that the sensory perception of the reproduced information is not, or not noticeably, affected, a single one of the markings may affect the reproduced information for less than 250 ms, and particularly less than 100 ms. In general, it is possible to speak of an unperceivable or hardly perceivable effect on the reproduced information, depending on the speed at which the information intended for reproduction is read out, if the extent of a single one of the markings, perpendicularly to a read-out direction, is less than about 500 μm, and particularly less than about 200 μm.

The sequence of markings which individualizes the medium can be formed only once (e.g. at a unique location) on the medium. However, forming the sequence of markings several times, spatially displaced, on the medium can also be considered.

According to a variation of the invention, on the medium, analog information intended for reproduction is contained in a first section, and digital information intended for reproduction is contained in at least one second section. The sequence of markings which individualizes the medium can be formed exclusively in the first section, i.e. in the area of the analog information intended for reproduction, exclusively in the second area or simultaneously in both areas.

The analog and digital information can correspond to each other. In other words, the analog and digital information can be provided redundantly and the content can agree. This would be useful, for instance, if the second section of the medium (with the digital information) is used as the primary information source, and the first section (with the analog information) as the secondary (or redundant) information source. The secondary information source can be provided for those cases in which the primary information source is unavailable, or only available with restrictions, or the technical means which are present for reading out only make it possible to read out the analog information. Of course, forming the markings in the second section of the medium instead of the first section could also be considered. This procedure would be conceivable, for instance, if the first section functions as the primary information source.

The digital information corresponding to the analog information, in the area of which the markings are formed, may be absent and/or unreadable. By omitting the digital information or making it unreadable in places, or by other steps, a transition from the primary to the secondary information source can be enforced. In this way, reading out the analog information in places is achieved simultaneously with reading out the sequence of markings which individualizes the medium.

Where the unreadable digital information is (or was) formed, the medium can have subsequently changed optical properties. Thus in a first step, the digital information can be associated with the medium, and in a subsequent second step, the digital information can be mechanically or optically changed in places (e.g. using mechanical devices or a laser).

The first medium section, which contains the analog information, can be an optical sound track, and the second medium section, which contains the digital information, can be a digital sound track. Multiple digital sound tracks can also be provided simultaneously. In this case, one, some or all digital sound tracks may be absent and/or unreadable in places. The digital sound track at a location which is adjacent to or in the proximity of the markings may be absent and/or unreadable. For example, the digital sound track may be absent and/or unreadable in a portion that corresponds information-wise to the portion of the analog data where the markings have been placed (although the two portions may be spatially separated).

The invention also relates to an identified medium, which contains the information intended for reproduction and was obtained by copying the medium (the "master medium") explained above. The information intended for reproduction (including the sequence of markings which individualizes the master medium) can be contained on the medium which is obtained by copying the master medium, in a changed format. For example, the information intended for reproduction no longer has to be contained on the copy in a continuous sequence. It would also be conceivable that the copying includes formatting mechanisms such as, for instance, analog/digital conversion. Whereas the information intended for reproduction can be present on the master medium in, for instance, an analog format, it can be stored on the medium which is obtained by copying the master medium (e.g. a CD, a CD-ROM, a DVD or a DVD-ROM) in digital form.

According to a further aspect of the invention, a method of identifying a master medium, like a master medium on which a copy is based, is made available. The method may comprise the steps of reading out the information which is contained on the available medium (the master medium or the copy), and intended for reproduction, in an area which is provided with the markings, of evaluating the read-out information to determine the sequence of markings, and of identifying the master medium on the basis of the determined sequence of markings.

The evaluation of the read-out information can include reproducing the read-out information and analyzing the reproduced information. This means that the sequence of markings can, for example, be determined not directly on the basis of the read-out information, but on the basis of the information which is reproduced, for instance acoustically or optically. To determine the sequence of markings in the read-out or reproduced information, image and/or spectrum analysis can be used. Additionally, mechanisms such as picture and/or sound filtering can be applied.

The sequence of markings can be determined on the basis of reference information. If no marked reference information is available, identification of the individual markings is possible on the basis of a comparison of the information which is read out from the medium, and which is intended for reproduction or already reproduced, with this reference information.

BRIEF DESCRIPTION OF DRAWINGS

Further advantages and details of the invention are given by the following description of preferred embodiments and by the figures.

FIG. 3b shows a modification of the third embodiment according to FIG. 3a;

FIG. 4 shows another modification of the third embodiment according to FIG. 3a.

DESCRIPTION OF PREFERRED EMBODIMENTS

In the following, preferred embodiments of media according to the invention, and identification methods according to the invention for media, are explained.

Figure 1:
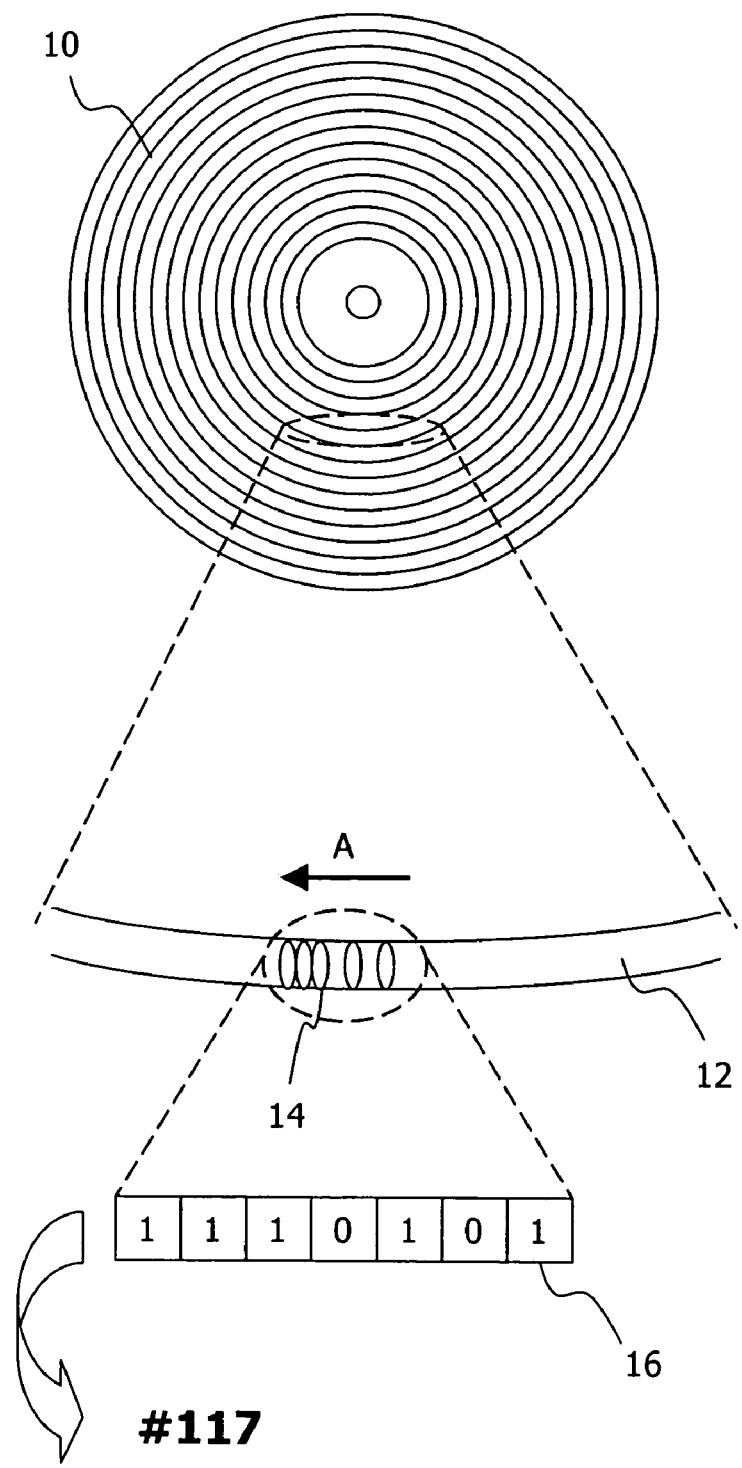
FIG. 1 shows a first embodiment of a medium according to the invention, in the form of a gramophone record.

FIG. 1 shows a first medium according to the invention for analog sound information in the form of a gramophone record 10. In the case of the record 10, the sound information is contained in a continuous sequence (e.g. as a song) and in logical succession in the area of a spiral groove. More precisely, the sound information is defined by the structural properties (elevations/depressions) of the groove.

In FIG. 1, a section of the spiral groove 12 is shown enlarged. For clarity, the sound information, i.e. the elevations and depressions which are formed in the area of the groove 12, are not shown. On the other hand, a sequence of markings 14, which is formed in the groove 12 and thus in the area of the sound information, is depicted. The markings 14 are not shown to scale in relation to the groove 12. In fact, the markings 14 are in such a form that the effect on the reproduction of the sound information when the record 10 is played on a record player is hardly perceptible to a listener. To avoid affecting the enjoyment of the music, for instance, the markings 14 can be formed in a quiet transition section between two successive titles. On the other hand, if the markings are to be acoustically hidden to a large extent, providing the markings 14 within a title can be considered.

As is shown by FIG. 1, the sequence of markings 14 can be interpreted as a binary code 16. With reference to a read-out direction which is identified by the arrow A, the markings 14 in the example case of FIG. 1 form the binary number 1 1 1 0 1 0 1. This binary number corresponds to the decimal number 117. In other words, the identification 117 is assigned to the record 10. This identification can be, for instance, a serial number or a batch designation.

The markings 14 are formed mechanically or by a non-contact method using a laser. The markings 14 were formed after the record 10 was pressed. However, it would also be possible to form the markings 14 when the record 10 is pressed, and thus simultaneously with the sound information.

As is shown by FIG. 1, the individual markings 14 extend substantially perpendicularly to the read-out direction A. The width of one of the markings, perpendicularly to the read-out direction A, is less than about 50 μm.

When the sound information which is contained on the record 10 is reproduced, it is changed in a way which individualizes the record 10 when the needle of the record player traces, i.e. reads, the sequence of markings 14.

Figure 2:
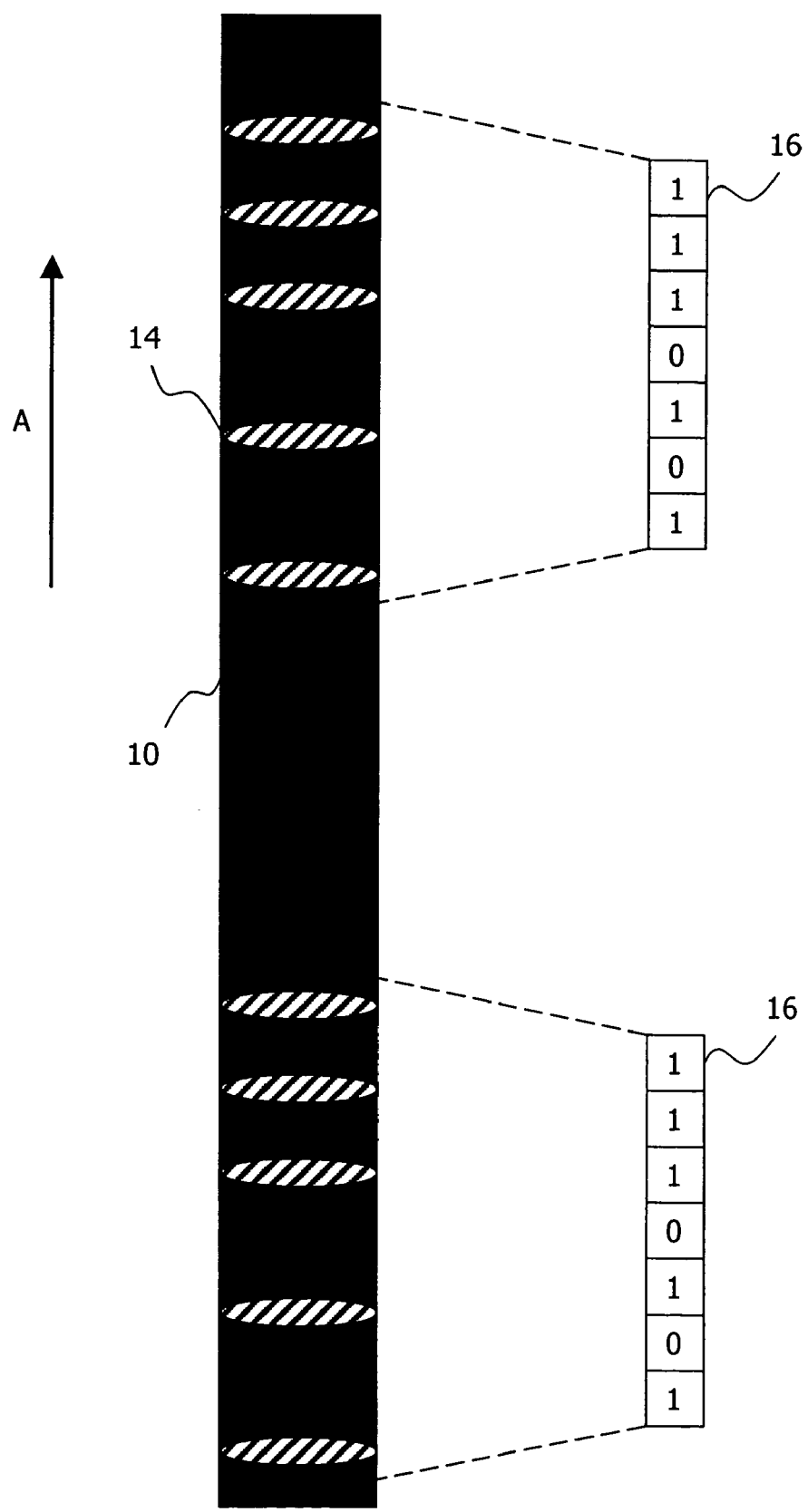
FIG. 2 shows a second embodiment of a medium according to the invention, in the form of a magnetic tape.

In FIG. 2, a section of a second embodiment of a medium according to the invention, in the form of a magnetic tape 10, is shown. In the following, identical reference numbers will be used for the same or like components.

On the magnetic tape 10, analog or digital sound and/or picture information is recorded. This information intended for reproduction is contained on the magnetic tape 10 in a continuous sequence along the read-out direction which is identified by the arrow A.

As can be taken from FIG. 2, in the area of the information intended for reproduction a twice repeated sequence of markings 14 is formed. The markings 14 were obtained by a local change of the magnetic properties of the magnetic tape 10, and formed after the information intended for reproduction was recorded. For clarity, the individual markings 14 in FIG. 2 are shown as hatched ellipses. In reality, the markings 14 cannot be detected visually.

As already explained in connection with FIG. 1, the sequence of markings 14 represents a binary code 16. More precisely, the sequence of markings 14 stands for the binary number 1 1 1 0 1 0 1 (decimal 117). The sequence of markings 14 is therefore suitable for identifying the magnetic tape 10 in individualizing fashion.

The sequence of markings 14 is read out when the magnetic tape 10 is played, together with the information intended for reproduction, and makes itself noticeable in a way which individualizes the magnetic tape 10 when the information is reproduced. The geometrical dimensions of the markings 14 and the strength of the change of the magnetic properties in the area of the markings 14 are chosen in such a way that there is little or no effect on the perception of the reproduced information by the audience.

Figure 3A:
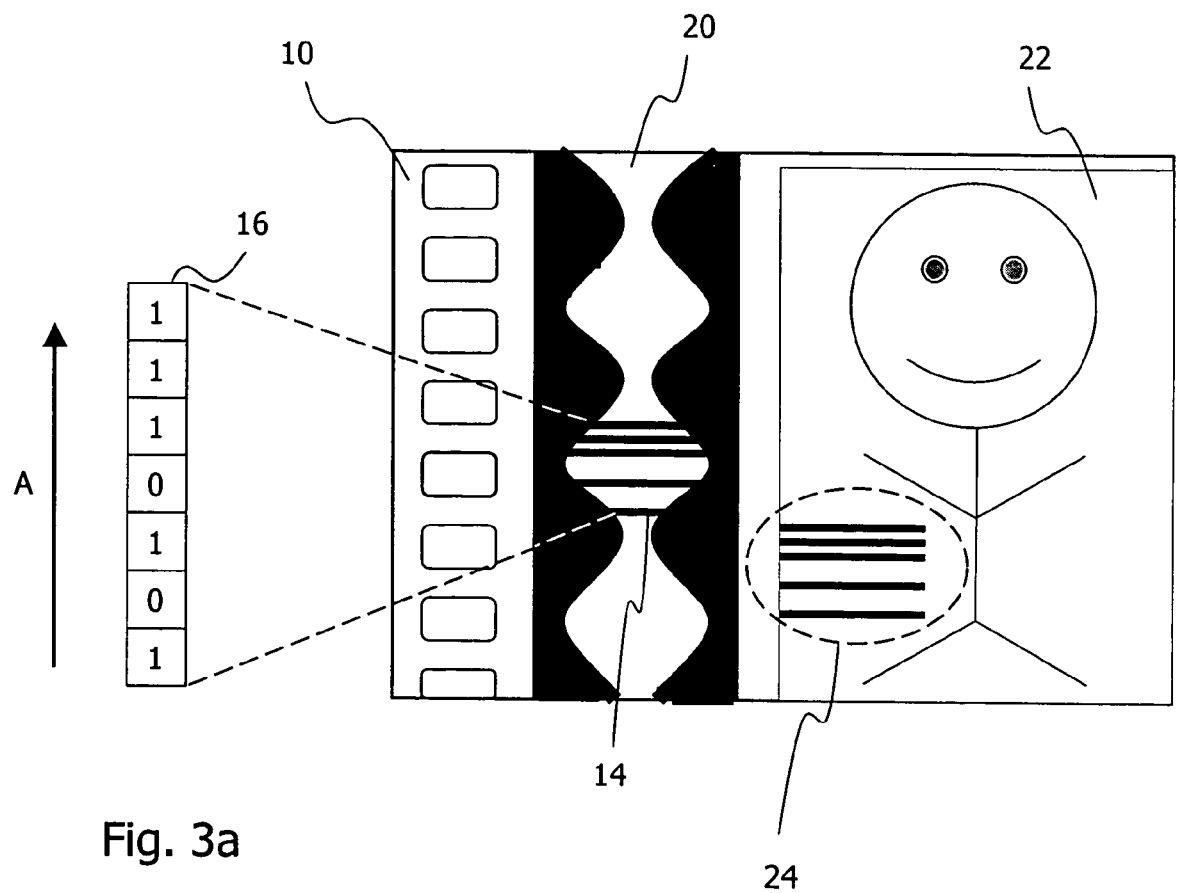
FIG. 3a shows a third embodiment of a medium according to the invention, in the form of a celluloid film.

In FIG. 3a, a third embodiment of a medium according to the invention, in the form of a celluloid film 10, which has the shape of a tape, provided with analog sound and picture information, and for reproduction using a film projector, is shown. The sound information is in the form of an optical sound track 20 in a continuous sequence. The picture information is also contained in a continuous sequence, e.g. as a cinema film, in a section 22 which is adjacent to the optical sound track 20.

In FIG. 3a, it can clearly be seen that in the area of the optical sound track 20, a sequence of parallel, bar-shaped markings 14 is formed. From the point of view of a read-out direction A, the sequence of markings 14 can be interpreted as a binary code, and more precisely as the binary number 1 1 1 0 1 0 1 (decimal 117). The markings 14 which are formed in the area of the optical sound track 20, for instance subsequently mechanically or using a laser, can be interpreted as a change to the optical properties of the celluloid film. In the case of optical reading-out of the optical sound track 20 and the subsequent reproduction of the read-out sound, the markings 14 which are contained in the read-out sound information therefore make themselves noticeable in a way which individualizes the celluloid film 10.

The markings which are formed in the area of the optical sound track 20 have an extent, perpendicularly to the read-out direction A, of typically 50 to 250 μm. On the one hand to ensure high recognition probability, and on the other hand to avoid affecting the sound reproduction noticeably, a marking width of about 80 to 120 μm has been shown to be particularly useful.

Alternatively or additionally to the provision of a sequence of markings in the area of the optical sound track 20, such markings can also be formed in a section 24 of the picture (or image) area 22. The markings 14 can be contained in a single picture or in a sequence of multiple pictures. The markings change the optical properties of the celluloid film in the section 24 of the picture area 22. In the case of (optical) reading out of the picture information, therefore, the sequence of markings in the section 24 is read out simultaneously with the picture (and/or acoustical) information.

Figure 3B:
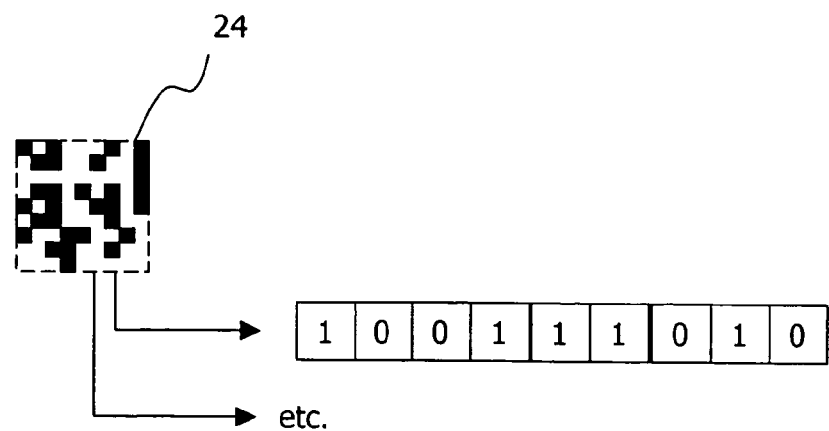

The markings which are formed in the section 24 of the picture area 22 can be a sequence of bars, as shown in FIG. 3a. However, as shown in FIG. 3b, the sequence of markings can also be a grid pattern. Such a grid pattern has the advantage that it has a less interfering effect on the reproduced picture information. Additionally, the grid pattern which is shown in FIG. 3b allows stronger individualization, because the grid pattern makes a higher number of individual codes available.

The grid pattern which is shown as an example in FIG. 3b consists of individual code columns or rows, each of which corresponds to a binary code. Thus the third code column from the right of the code pattern corresponds to the binary number 1 0 0 1 1 1 0 1 0, etc.

The individual markings can be formed on the medium in such a way that they occur sequentially in the reproduced information. This is so, for instance, in the case of the embodiment according to FIG. 3a, for the markings 14 which are formed in the area of the optical sound track 20. The individual markings occur in succession in the reproduced sound. On the other hand, it is also conceivable that the totality of the individual markings occurs simultaneously in the reproduced information. This can be the case if the markings are included in picture information (the section 24 in FIGS. 3a and 3b). However, it would also be conceivable that the individual markings of the marking sequence occur in succession in the picture information, and are thus reproduced at time intervals. This has the advantage that the perception of the reproduced picture information is less affected.

Figure 4:
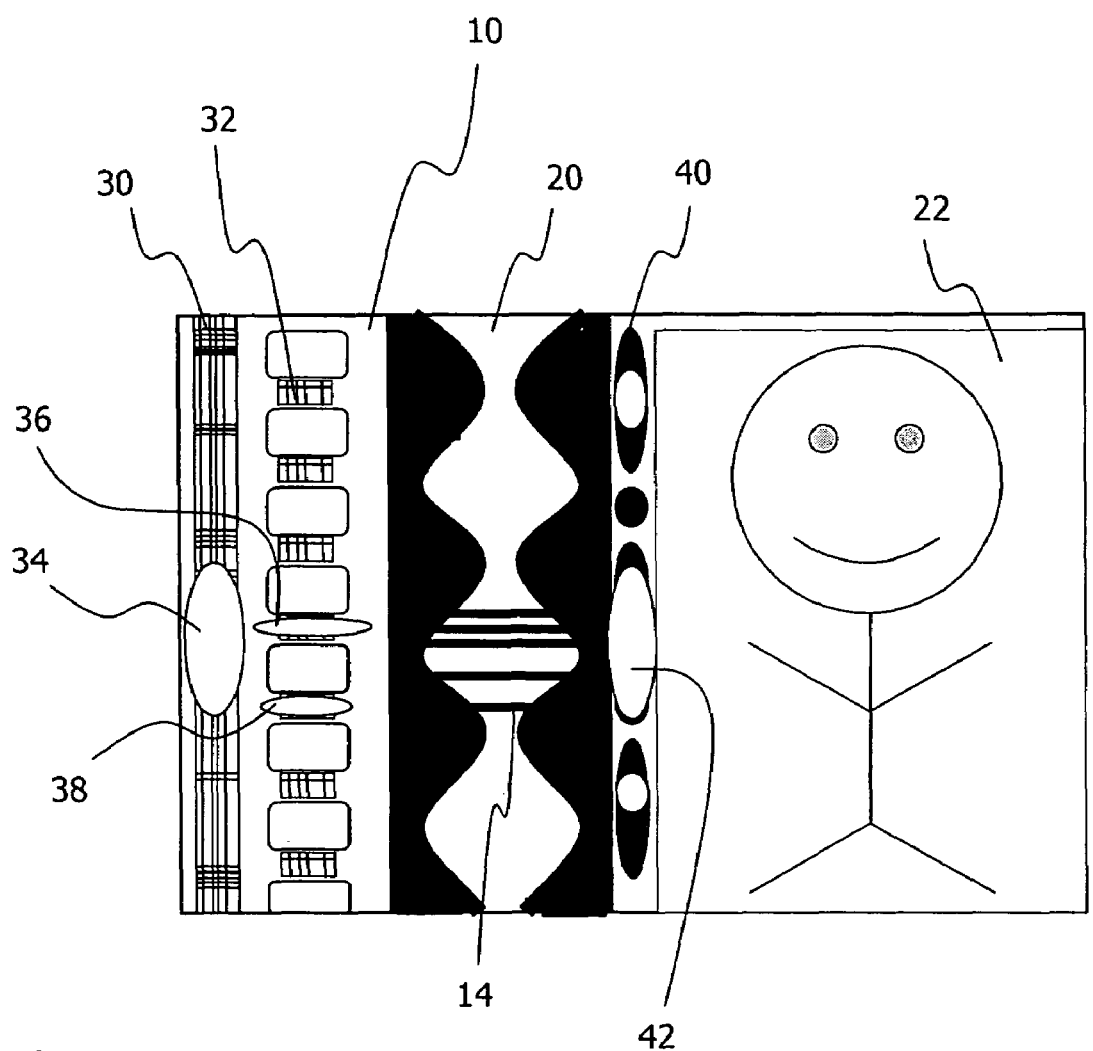

In FIG. 4, a modification of the embodiment which has been described with reference to FIG. 3a is shown. Corresponding elements are again identified by corresponding reference symbols.

As is shown by FIG. 4, on the medium 10, which is in the form of a celluloid film, as well as a first section with analog information intended for reproduction, i.e. the optical sound track 20, there are two further sections 30, 32, each of which contains digital information intended for reproduction. Each of these two further sections is a digital sound track 30, 32, which runs parallel to the optical sound track 20. The digital sound track 30, which is formed quite on the edge of the medium 10, is half an SDDS sound track (the other half is arranged on the opposite edge of the medium 10 and not shown in FIG. 4). The second digital sound track 32, which is formed between the perforations which are used to transport the film, is an SRD sound track.

Additionally, a sound control track 40 (such as a DTS time code track) is provided on the medium 10. The control track 40 is scanned during reproduction and sent to a is DTS play back device. Based on the control information thus received, the DTS play back device synchronizes the reproduction of picture information with the reproduction of sound information that is read from a DTS CD rom.

The sets of information which are contained in the altogether three sound tracks 20, 30 and 32 or that can be derived from the control information read from the time code track 40 agree with each other redundantly. For this reason, usually only one of the tracks, often the SRD sound track 32, is read out. The analog sound track 20 is read out only if a read-out device (e.g. a film projector) does not allow the tracks 30, 32, 40 to be read out, or if the tracks 30, 32, 40 are dirty, defective or otherwise unreadable. In other words, the optical sound track 20 is often used as a "fallback solution".

As can be taken from FIG. 4, the digital sound tracks 30, 32 and the time code track 40 at the locations adjacent to the markings 14 of the optical sound track 20 are removed, or reading out was prevented at these locations (strictly speaking the portions of the tracks 30, 32 and 40 that correspond information-wise to the portions of the analog data in which the markings are formed are rendered illegible). For this purpose, speck-like changes 34, 36, 38 and 42 were made in the two digital sound tracks 30, 32 and the time code track 40 by means of a laser. Alternatively, stripe-like changes may be made by scratching, cutting or the like. Not applying the tracks 30, 32, 40 at the locations 34, 36, 38 and 42 during manufacture, or making the tracks 30, 32, 40 unreadable at the locations 34, 36, 38 and 42 by mechanical means (by nicking, scraping, etc.), could also be considered.

The effect of the absence or illegibility of digital sound information or time code information at the locations 34, 36, 38 and 42 is that the read-out device falls back on the optical sound track 20 at the locations 34, 36, 38 and 42 and reads out the analog information which is formed there. Simultaneously with the analog information, the sequence of markings 14 (as described above) is also read out. Reading out one or both of the digital sound tracks 30, 32 as well as the time code track 40 is therefore deliberately prevented, to cause the compulsory reading out (and compulsory reproduction) of the marking sequence 14.

The embodiment according to FIG. 4 is particularly interesting if a digital correction procedure removes (e.g. by interpolation) faults in a digital information track as they are generated by the sequence of markings. If no correction procedure were to be used, the sequence of markings could also be applied (exclusively or additionally) in one of the digital information tracks.

Below, a method of identifying one of the media which has been explained with reference to FIGS. 1 to 4, or a copy of it, is explained in more detail. It is assumed here that the sequence of markings which individualizes the medium is formed in the area of the sound information, and is read out together with the sound information. It is also assumed that the location at which the sequence of markings is contained in the sound information is known.

If the sound information has been read out of an area of the medium which is provided with the markings, this information is subjected directly, or after being reproduced and acoustically captured, to spectrum analysis in a spectrum analyzer. Simultaneously, suitable sound filtering is carried out. Corresponding reference sound information (which acoustically does not include the markings) is subjected to the same preparation mechanisms as the read-out sound information. The reference sound information which is prepared in this way is then subtracted from the prepared read-out sound information.

Figure 5:
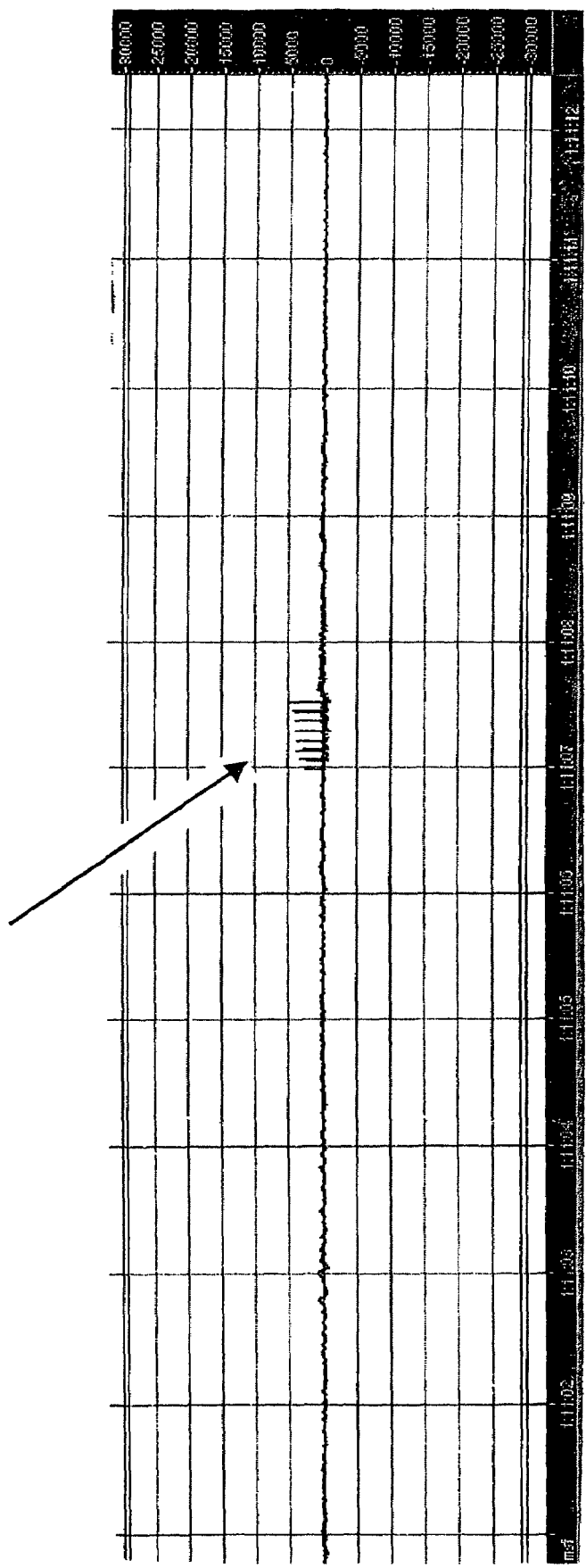
FIG. 5 shows a measured diagram for determining the sequence of markings which is contained in the reproduced sound information.

The result of the subtraction is shown in FIG. 5. The sequence of individual peaks, corresponding to the sequence of markings (in the example according to FIG. 5, 8 successive markings=binary 1 1 1 1 1 1 1 1) which is contained in the read-out sound information, can clearly be seen. The position, height and width of the peaks (i.e. pitch/volume) can be deliberately influenced by the spacing, intensity and dimensioning of the markings which are formed on the medium. The volume of the markings is usefully at least 5 dB, and preferably at least 10 dB, above the background volume level of the reference information.

Although the sequence of markings in the read-out sound signal is imperceptible or hardly perceptible to an audience, by suitable methods the sequence of markings can thus be determined, and the present medium can be uniquely identified, at any time. A special feature of the method is that the identification which is assigned once to a master medium is retained even when the master medium is replicated, and in particular when the data format of the acoustic information is changed (e.g. analog->digital).

The embodiments which are explained with reference to FIGS. 1 to 4 illustrate the ideas on which the invention is based, but cannot be interpreted restrictively. In particular, other information media and other markings may come to be used. The arrangement of the information intended for reproduction on the medium may also be chosen differently from the embodiments. Arranging the information which is contained in a continuous sequence at separate locations of the medium, at a distance from each other, is thus conceivable. By means of suitable read-out mechanisms, it is possible to ensure even in this case that the continuous information which is read out at different locations is actually also reproduced continuously. However, if only simpler read-out mechanisms are available, logical stringing together of the continuous information sequence on the medium is often unavoidable.

While the invention has been described in detail and with reference to specific embodiments thereof, if will be apparent to one skilled in the art that various changes and modifications can be made therein without departing from the spirit and scope thereof. Thus, it is intended that the present invention cover the modifications and variations of this invention provided they come within the scope of the appended claims and their equivalents.

The invention claimed is:

1. A method of marking a machine-readable medium containing information which is included in a continuous sequence on the medium and is intended for reproduction, comprising the step of forming a sequence of markings which individualizes the medium, and which can be read out together with the information intended for reproduction, in an area of the information intended for reproduction, wherein on the medium, analog information intended for reproduction is contained in a first section, and digital information intended for reproduction is contained in at least one second section, the markings being formed at least in the first section.

2. The method according to claim 1, wherein the analog and digital information items are redundant to each other.

3. The method according to claim 2, wherein the digital information corresponding to the analog information in the area of which the markings are formed is absent or made unreadable.

4. The method according to claim 3, wherein the optical properties of the medium, where the unreadable digital information is or was formed, are subsequently changed.

5. The method according to claim 1, wherein the first section is an optical sound track.

6. The method according to claim 5, wherein the at least one second section is a digital sound track.

7. The method according to claim 6, wherein the digital sound track, at a location adjacent to the markings on the optical sound track, is absent or made unreadable.

8. A film medium, in which information is contained in a continuous sequence for reproduction, comprising:

a sequence of markings formed on the film medium in an area of the information intended for reproduction, which markings individualize the medium, and wherein said markings are readable together with the information intended for reproduction, wherein said sequence of markings is a sequence of parallel bars, and wherein each marking of said sequence of markings extends perpendicular to said travel direction, each having a length in a range from about 50 to 250 µm.

9. A film medium, in which information is contained in a continuous sequence for reproduction, comprising:

a sequence of markings formed on the film medium in an area of the information intended for reproduction, which markings individualize the medium, and wherein said markings are readable together with the information intended for reproduction, and wherein on the medium, analog information intended for reproduction is contained in a first section, and digital information intended for reproduction is contained in at least one second section, the markings being formed in the first section.

10. The film medium of claim 9, wherein said analog and digital information correspond with one another.

11. The film medium of claim 10, wherein said digital information, corresponding to said analog information in the area of said sequence of markings, is absent or made unreadable.

12. The film medium of claim 11, wherein the film medium, where the unreadable digital information is or was formed, has subsequently changed optical properties.

13. The film medium of claim 10, wherein the first section is an optical sound track.

14. The film medium of claim 10, wherein said at least one second section is a digital sound track.

15. The film medium of claim 10, wherein the digital sound track, at a location adjacent to the markings on the optical sound track, is absent or made unreadable.

16. A film medium, in which information is contained in a continuous sequence for reproduction, comprising:

a first section of information being an optical soundtrack, said first section containing analog information for reproduction;

a second section of information being a digital soundtrack, adjacent said first section, said second section containing digital information, wherein said digital information corresponds with said analog information of said first section; and a sequence of markings formed in said first section which individualize the medium, said markings being sequence of parallel bars, each bar extending perpendicular to a travel direction of the film medium, said markings being readable together with the information of said first section of information, wherein upon reproduction of information of said first section, said sequence of markings has little or no effect on the perception of the reproduced information by an audience.

17. The film medium of claim 16, wherein said digital information in said second section, corresponding to said first section where said sequence of markings is formed, is absent or made unreadable.

18. The film medium of claim 16, wherein said sequence of markings is an identification code.

19. A method of marking a film medium, in which information is contained in a continuous sequence for reproduction, wherein said film medium includes a first section containing analog information and a second section containing digital information, said analog information corresponding with said digital information, said method comprising the steps of:

forming a sequence of markings on said first section, said markings individualizing said medium and being readable together with said analog information; and eliminating or making unreadable digital information in at least a part of said second section corresponding to said sequence of markings on said first section.

20. The method of claim 19, wherein said sequence of markings is an identification code.

21. The method of claim 19, wherein reproduction of said sequence of markings has little or no effect on the perception of the reproduced information by an audience.

22. The method of claim 19, wherein said sequence of markings is a sequence of parallel bars.

23. The method of claim 22, wherein said parallel bars extend perpendicular to the travel direction of the film medium.

24. The method of claim 19, wherein said first section is an optical sound track.

25. The method of claim 19, wherein said second section is a digital sound track.

* * * * *